United States Patent
Jochumsen et al.

(10) Patent No.: US 8,371,113 B2
(45) Date of Patent: Feb. 12, 2013

(54) MIXING DEVICE FOR MIXING UREA AND AIR

(75) Inventors: Hans Henrik Jochumsen, Allerod (DK); Steen Kahler, Tikob (DK); Karim Lindberg, Vekso Sjaelland (DK); Martin Ebro Christensen, Frederiksberg (DK); Niels Stubager Kiemer, Veksoe Sjaelland (DK); Niels Torp Madsen, Birkerod (DK); Janus Juul Rasmussen, Helsinge (DK); Tom Johansen, Helsingborg (SE)

(73) Assignee: Grundfos NoNox A/S, Bjerringbro (DK)

( * ) Notice: Subject to any disclaimer, the term of this patent is extended or adjusted under 35 U.S.C. 154(b) by 966 days.

(21) Appl. No.: 11/910,955

(22) PCT Filed: Apr. 10, 2006

(86) PCT No.: PCT/DK2006/000202
§ 371 (c)(1),
(2), (4) Date: Sep. 10, 2008

(87) PCT Pub. No.: WO2006/108419
PCT Pub. Date: Oct. 19, 2006

(65) Prior Publication Data
US 2009/0031714 A1    Feb. 5, 2009

(30) Foreign Application Priority Data
Apr. 13, 2005 (DK) .................... 2005 00531

(51) Int. Cl.
*F01N 3/10* (2006.01)

(52) U.S. Cl. ............... 60/303; 60/286; 60/289; 60/293; 60/295; 60/301; 239/411; 239/413; 239/417.5

(58) Field of Classification Search ............ 60/274, 60/286, 289, 293, 295, 297, 301, 303; 239/411, 239/413, 417.5
See application file for complete search history.

(56) References Cited

U.S. PATENT DOCUMENTS

| 5,431,893 A | * | 7/1995 | Hug et al. ............... 423/239.1 |
| 5,884,475 A | * | 3/1999 | Hofmann et al. ............... 60/274 |
| 5,943,858 A | | 8/1999 | Hofmann et al. |

(Continued)

FOREIGN PATENT DOCUMENTS

| EP | 0 586 913 A2 | 8/1993 |
| JP | 08-206459 | 8/1996 |

(Continued)

*Primary Examiner* — Binh Q Tran
(74) *Attorney, Agent, or Firm* — Knobbe, Martens, Olson & Bear, LLP

(57) ABSTRACT

The present invention provides a mixing device (1) for mixing urea with a gas, said urea being preferably dissolved in a fluid preferably water and said gas being preferably air. The mixing device comprises preferably a urea inlet (10) and a gas inlet (12) for feeding respectively urea and the gas into a mixing chamber (20) of the mixing device (4), and an outlet (14) for outlet of the mix of urea and gas from the mixing chamber (20), these inlets (10,12) and outlet (14) may preferably have a stream wise extension and runs preferably into the mixing chamber (20) and the outlet (14) originates preferably from the mixing chamber (20). Preferably, at least the gas inlet (12) for feeding air into the mixing chamber is designed so that depositing of urea crystals on selected surfaces of the said inlet is substantially (typically in the sense that deposited crystals does not clog the inlet) or totally avoided.

21 Claims, 13 Drawing Sheets

U.S. PATENT DOCUMENTS

Figure 1:
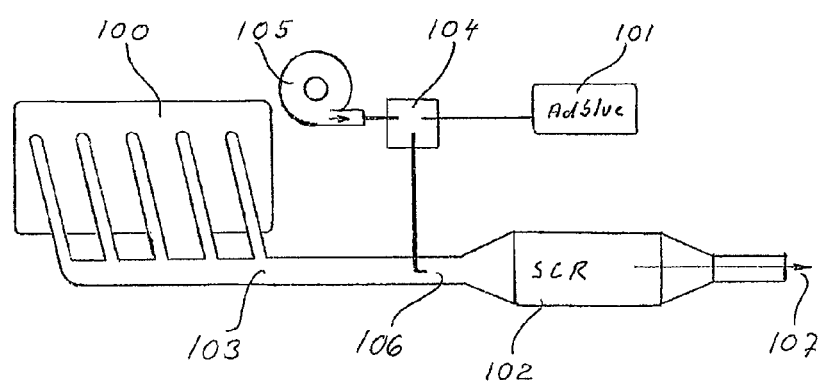

| | | | |
|---|---|---|---|
| 6,301,879 B1 * | 10/2001 | Weisweiler et al. | 60/274 |
| 6,878,359 B1 * | 4/2005 | Mathes et al. | 423/239.1 |
| 7,458,204 B2 * | 12/2008 | Plougmann | 60/286 |
| 7,500,356 B2 * | 3/2009 | Hirata et al. | 60/286 |
| 7,594,393 B2 * | 9/2009 | Offenhuber et al. | 60/286 |
| 2003/0145580 A1 | 8/2003 | Ripper et al. | |
| 2004/0101450 A1 | 5/2004 | Mayer | |

FOREIGN PATENT DOCUMENTS

| | | |
|---|---|---|
| JP | 9-511807 | 11/1997 |
| JP | 10-509646 | 9/1998 |
| JP | 2003-518218 | 6/2003 |
| WO | WO 2004/046513 A1 | 6/2004 |

* cited by examiner

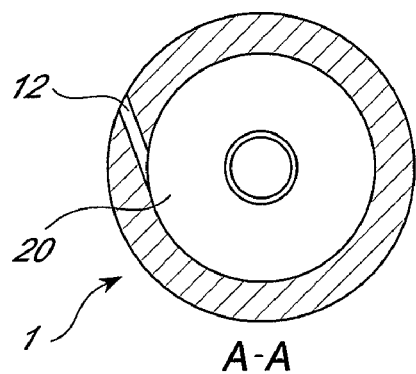
FIG. 3B
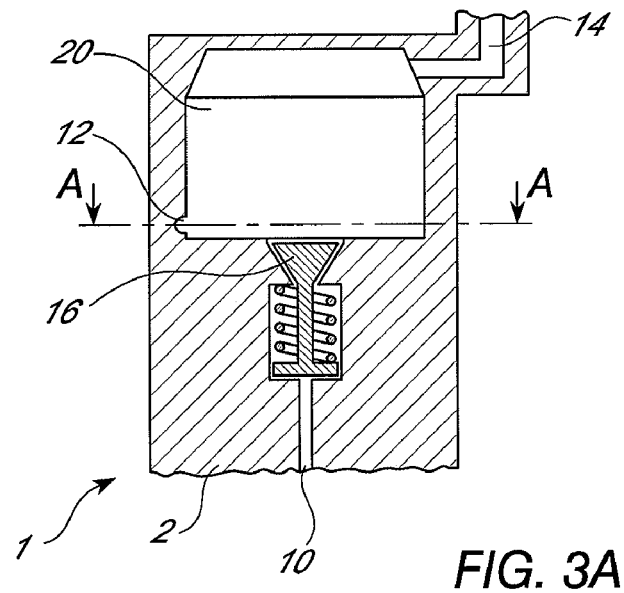
FIG. 3A
FIG. 3

MIXING DEVICE FOR MIXING UREA AND AIR

CROSS REFERENCE TO RELATED APPLICATIONS

This application claims priority to and is a U.S. National Phase filing of PCT International Application Number PCT/DK2006/000202, filed on Apr. 10, 2006, designating the United States of America and published in the English language, which claims priority under 35 U.S.C. §119 to Denmark Patent Application Number PA 2005 00531, filed on Apr. 13, 2005. The disclosures of the above-described applications are hereby expressly incorporated by reference in their entireties.

The present invention relates to mixing urea with air and introducing the mix of air and urea into the exhaust system of a combustion engine, in particular a diesel-fuel engine.

According to the present invention, it has been found that urea which is dissolved in a liquid such as water when being mixed with pressurised air may crystallise which typically result in that the mixing device used for mixing the urea with air will clog up so that no mixing can be performed. It has also been found that the crystal will grow in a direction upstream of the air stream (even at high speed).

An aim of the present invention is therefore to provide a device in which the clogging is minimised or avoided.

In accordance with a broad aspect of the present invention a mixing device for mixing urea with a gas, said urea being preferably dissolved in a fluid preferably water and said gas being preferably air is provided. The mixing device comprises preferably a urea inlet and a gas inlet for feeding respectively urea and the gas into a mixing chamber of the mixing device, and an outlet for outlet of the mix of urea and gas from the mixing chamber. These inlets and outlet may preferably have a stream wise extension and runs preferably into the mixing chamber and the outlet originates preferably from the mixing chamber. Preferably, at least the gas inlet for feeding air into the mixing chamber is designed so that depositing of urea crystals on selected surfaces of the said inlet is substantially (typically in the sense that deposited crystals does not clog the inlet) or totally avoided. This may as it appears from the claims and the description of preferred embodiments be provided by shaping these surfaces so smooth or using non stick materials that crystals can not be deposited on the selected surfaces preferably to such an extent that clogging is avoided. Alternatively or in combination thereto, the gas inlet may be designed so that crystals deposited on the selected surface are removed during use, e.g. during mixing, of the mixing device.

In accordance with the present invention, a number of different embodiments have been suggested which seeks to eliminate the clogging effect of the crystal growth and a detailed description thereof can be found in the accompanying section outlining various details of preferred embodiments of the invention as well as in the accompanying claims.

It should be noted that even though the present description focuses on mixing urea dissolved in water and air, the invention is also applicable and encompasses scenarios where other materials are mixed and where clogging due to formation of crystals occur or may occur.

Figure 2:
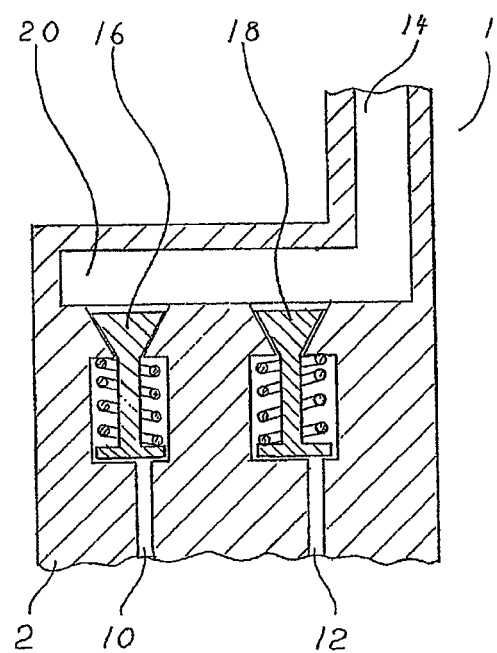
Figure 4:
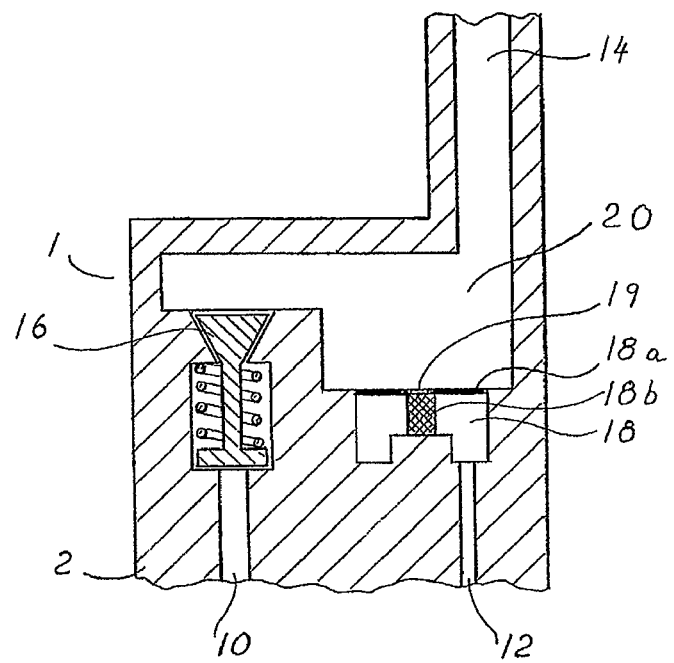

In the following the invention and in particular preferred embodiments thereof will be described in connection with the accompanying figures in which:

FIG. 1 shows the overall concept of adding urea to the exhaust gasses of a combustion engine in particular a diesel combustion engine, FIG. 2 shows a sectional view of preferred embodiment of a mixing device for mixing air with urea according to the present invention, FIGS. 3A-B shows a sectional view of another embodiment of a mixing device for mixing air and urea, FIG. 4 shows a sectional view of yet another embodiment of a mixing device for mixing air and urea.

Figure 5:
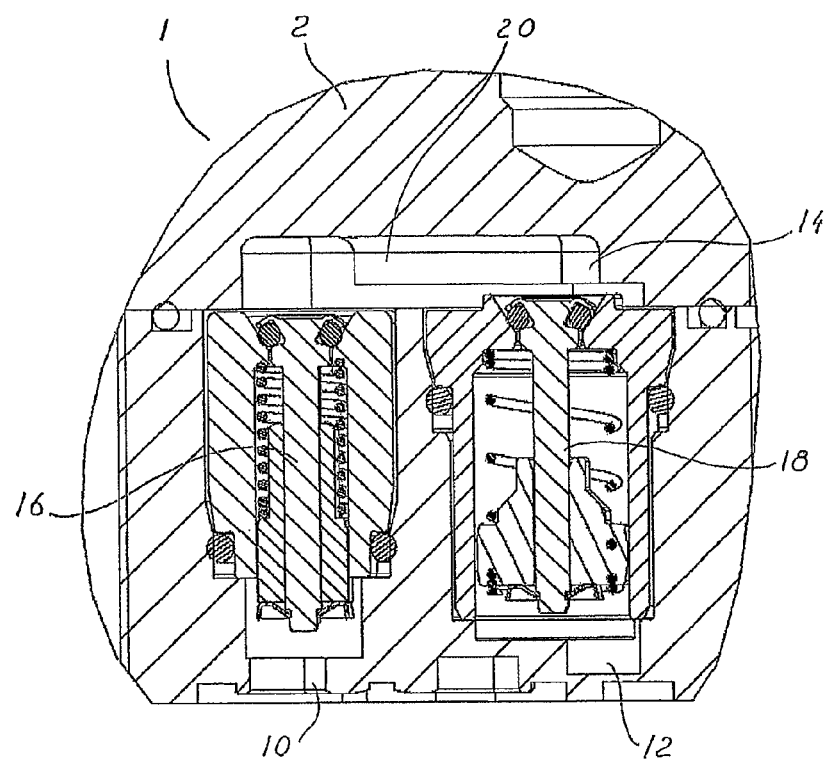
Figures 6A, 6B:
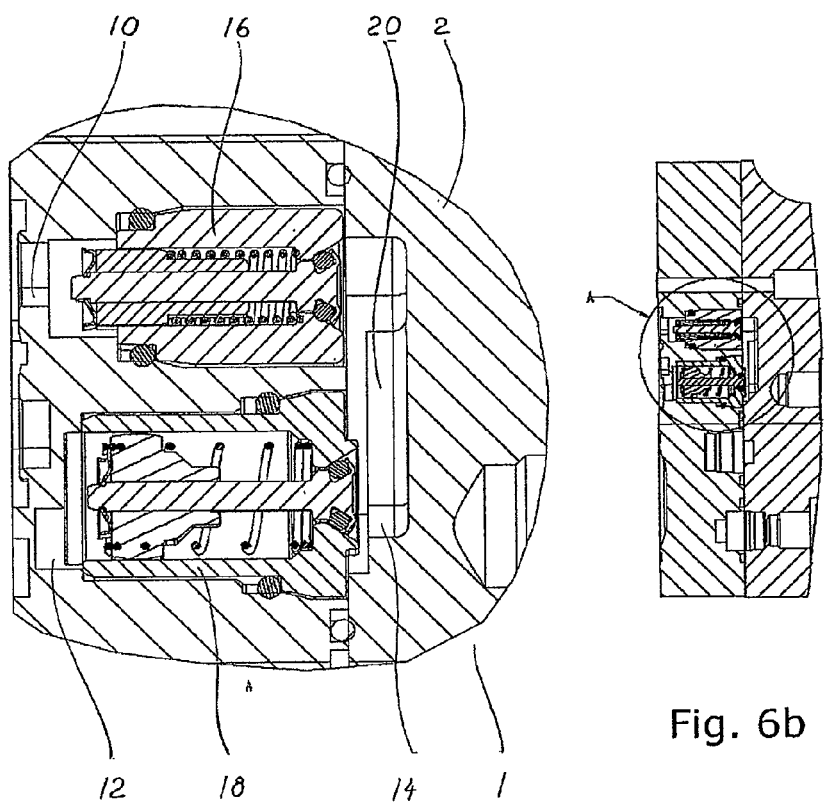
Figure 6C:
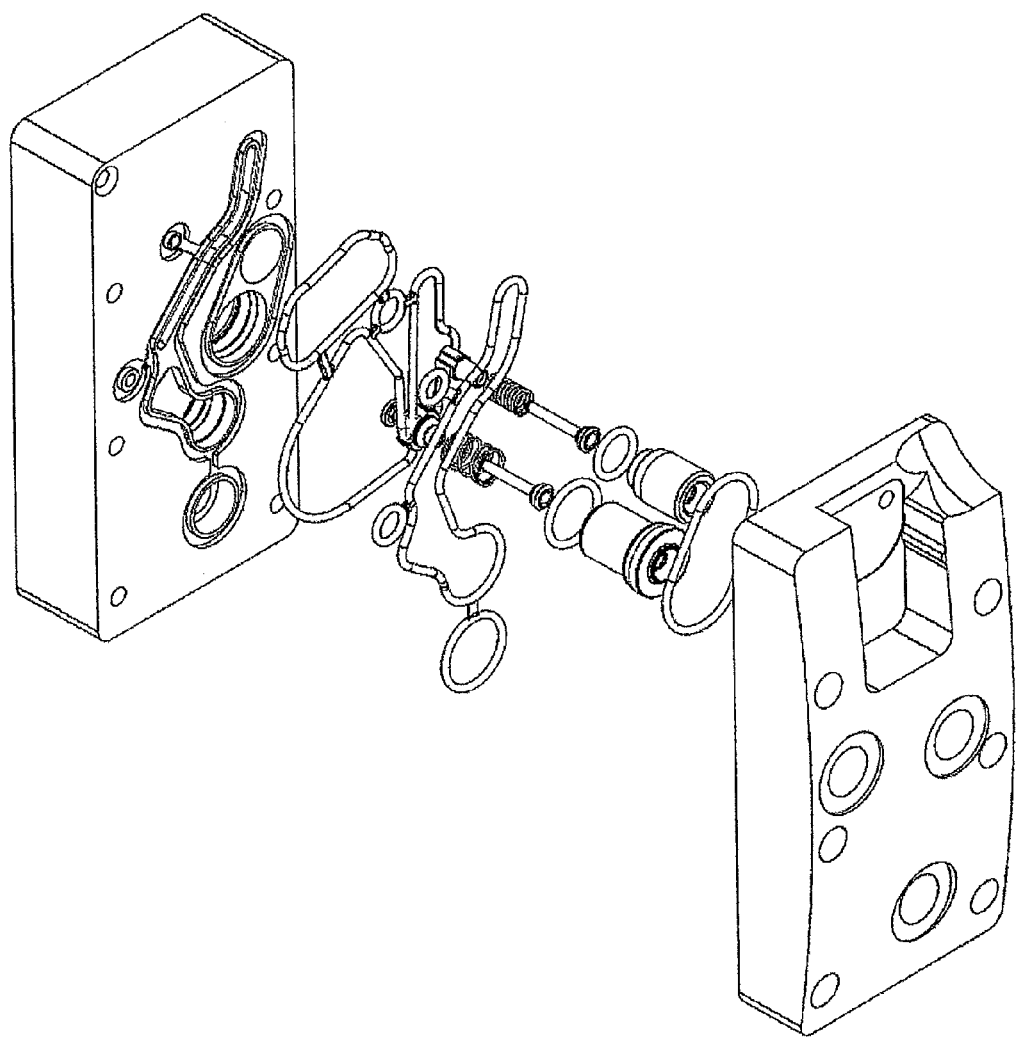
Figure 7:
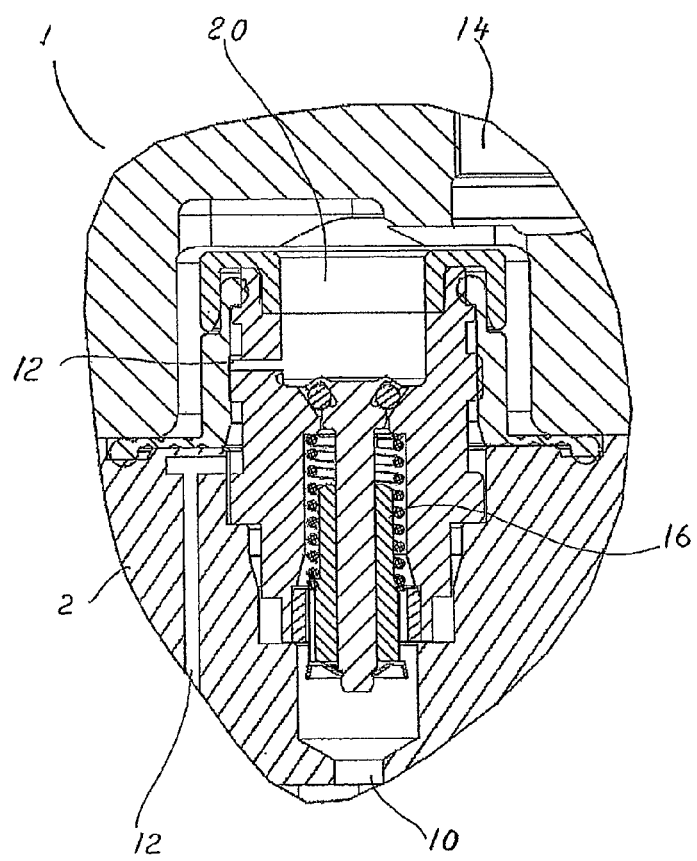
Figures 8A, 8B:
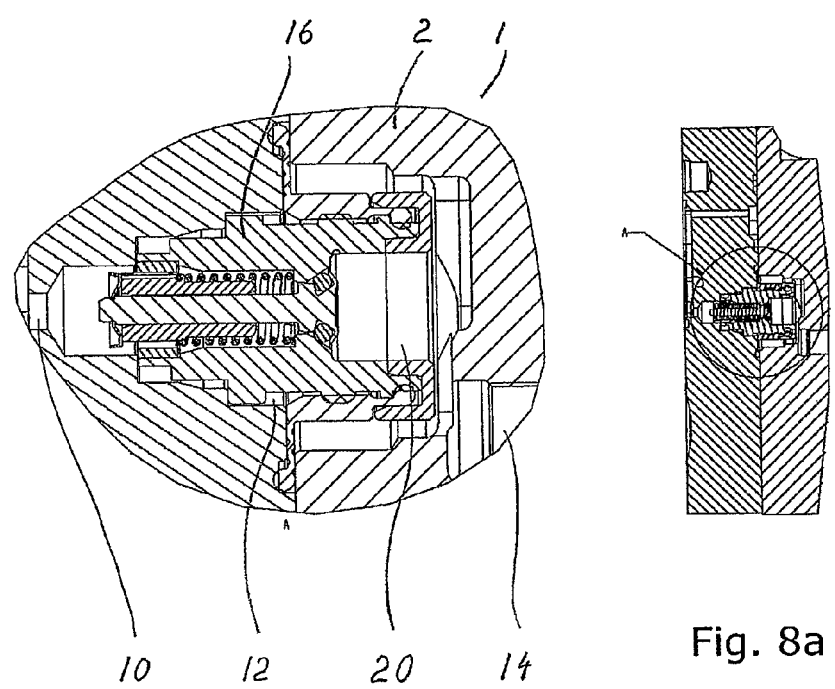
Figure 8C:
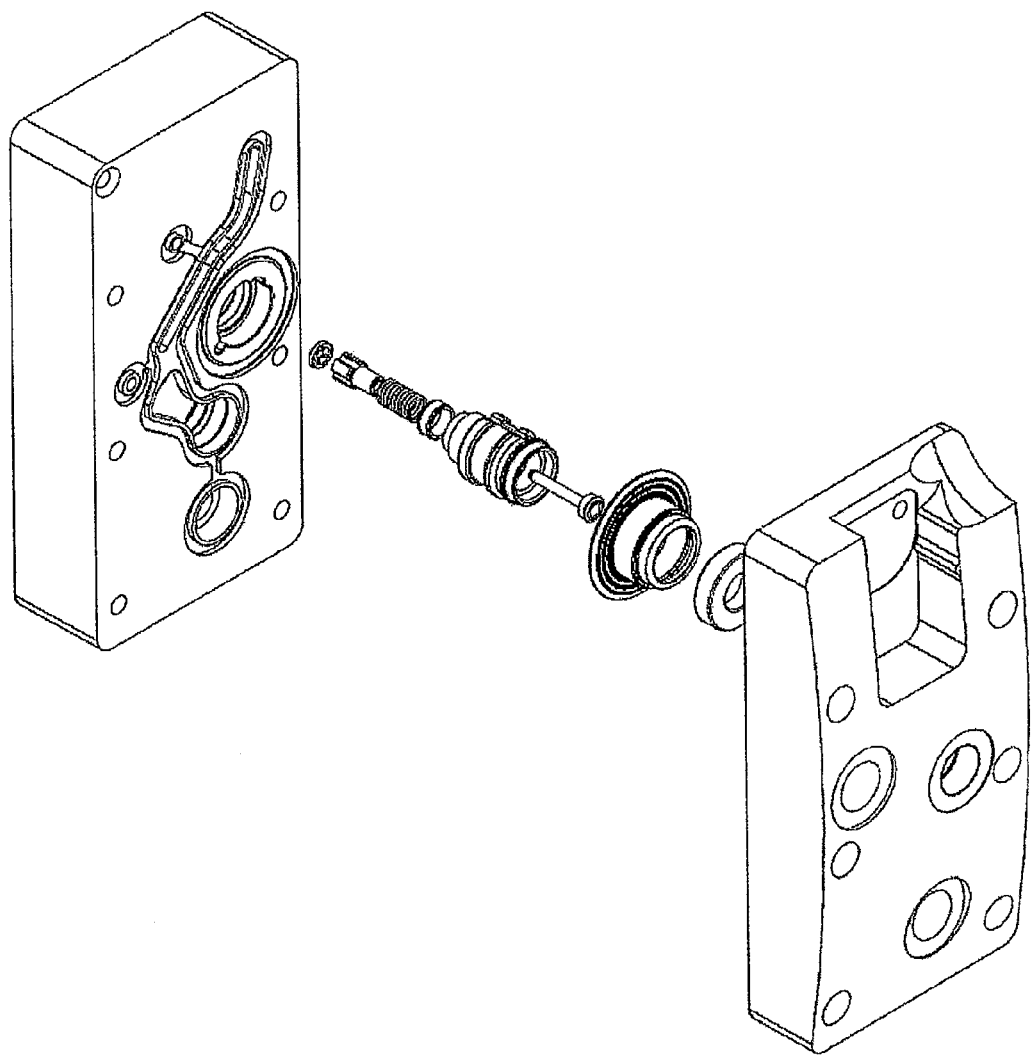
Figure 9:
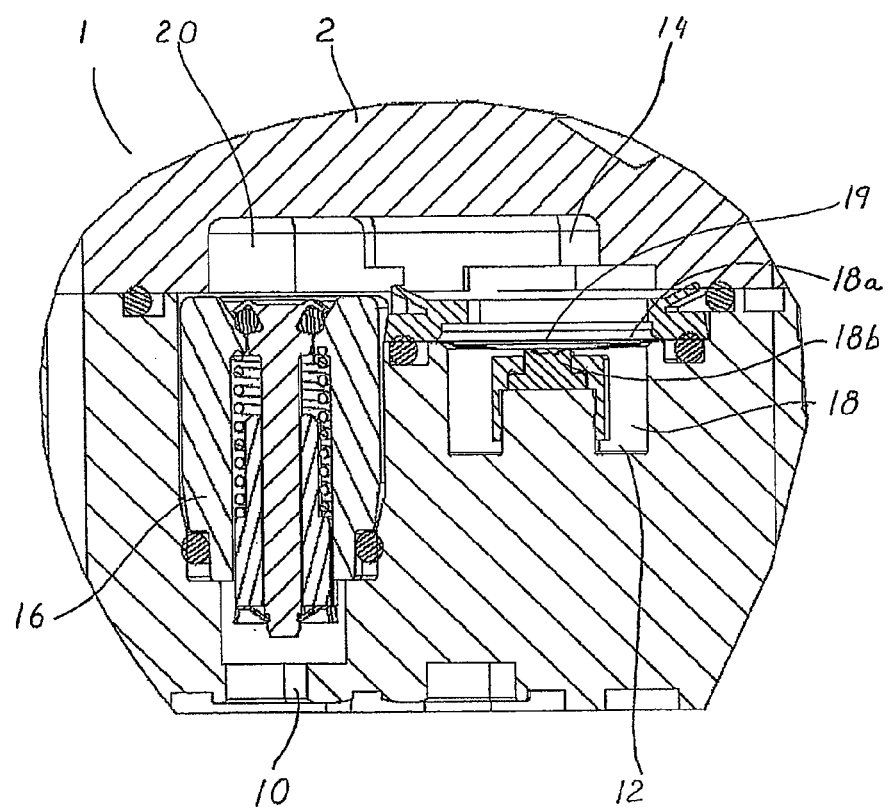
Figures 10A, 10B:
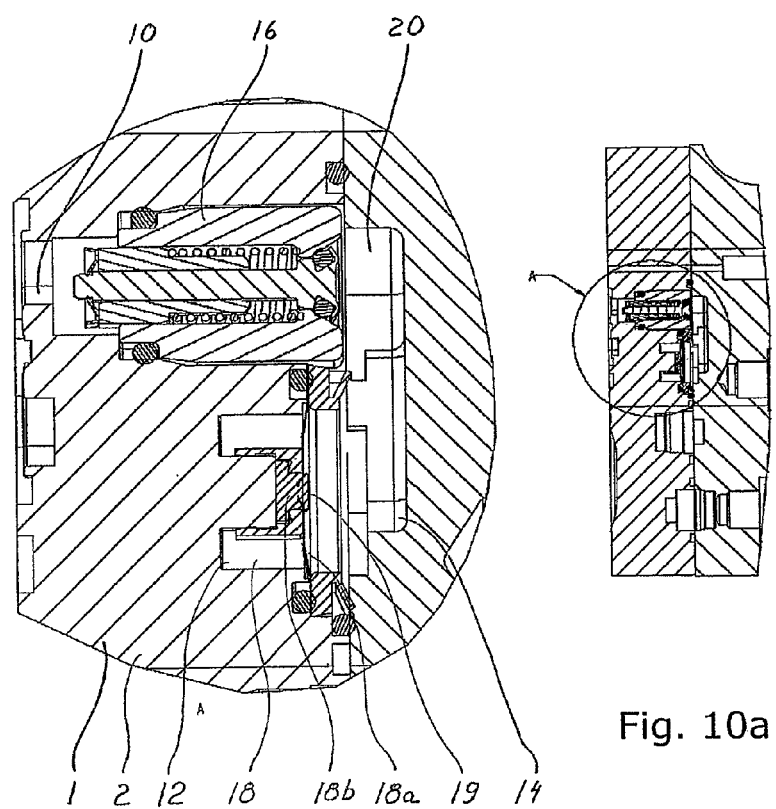
Figure 10C:
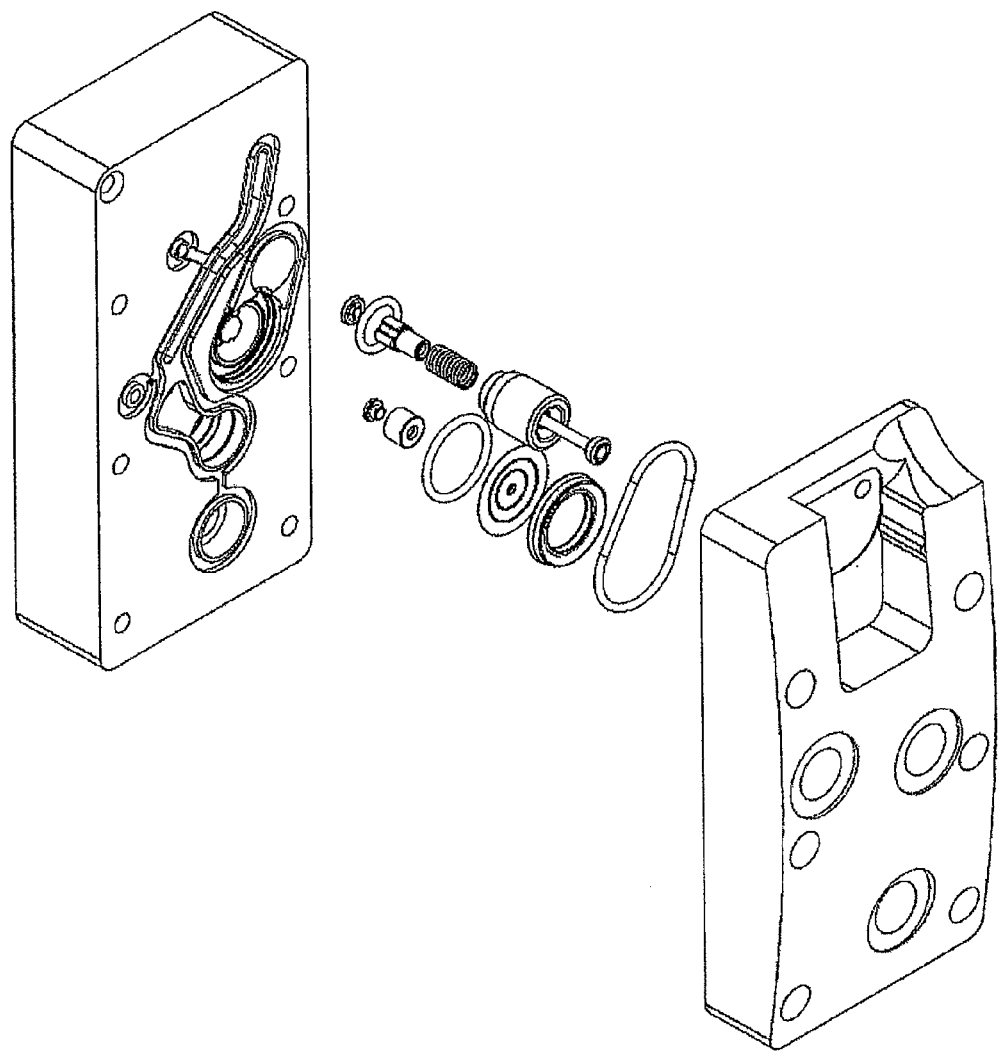

FIG. 5 shows a detailed sectional view of the embodiment shown in FIG. 2, FIG. 6A-C shows a sectional view, a detailed sectional view and an exploded view of the embodiment shown in FIG. 5, FIG. 7 shows a detailed sectional view of the embodiment shown in FIG. 3, FIG. 8A-C a sectional view, a detailed sectional view and an exploded view of the embodiment shown in FIG. 7, FIG. 9 shows a detailed sectional view of the embodiment shown in FIG. 4, and FIG. 10A-C shows a sectional view, a detailed sectional view, and an exploded view of the embodiment shown in FIG. 9.

In FIG. 1 a system comprising a combustion engine 100 preferably working according to the Diesel principle, a tank holding a liquid solution of urea 101 (known under the trade name AdBlue) and a catalytic system (denoted SCR in the figure) 102. The exhaust of the engine is connected to the catalytic system by an exhaust piping and which is connected to the tank holding the liquid solution of urea. The system further comprises a metering unit 104 for feeding the liquid urea into the exhaust system so that it may react with the exhaust gasses for minimisation of the discharge of $NO_x$ gasses to the environment. The metering unit will typically be or comprise a mixing device for mixing the liquid urea with pressurised air, and a compressor 105 preferably provides the pressurised air.

The exhaust gas 103 leaving the engine comprises nitrogen oxides. Before the exhaust gas enters into the catalytic system, referenced in FIG. 1 with 106, the gas comprises ammonia, water vapour, and nitrogen oxides. After the exhaust gas has entered through the catalytic system (107 in FIG. 1) the gas comprises nitrogen and water which typically is discharged to the environment.

In many of the preferred embodiments according to the present invention the engine is a diesel engine of a truck and in these embodiments the truck is equipped with a compressor for the brakes, suspension system and/or the like, and such embodiments the pressurised air is provided by this compressor. In order to avoid that urea enters into the brake and/or the suspension system the air supplied to the mixing device for mixing urea with air is typically provided through a one way valve (not shown) so that air can only enter into the mixing device. This function is important both when the truck is running (and urea is being mixed), and during stops where there is no flow of urea.

It has been found that formation of urea crystals in mixing devices for mixing urea and pressurised air may clog the device rendering so that no mixing with the device can be performed. The growth of crystal has a tendency to growth in a direction being upstream into the flow of pressurised gas. These problems have been solved by the present invention by designing the mixing device so that it comprise one or more of the following features either alone or in combination:

1. A mechanical action, typically a reciprocating movement of a valve. This movement of the valve may have two actions, first the impact of the valve on a valve seat will break the crystal so that they will be washed out of the valve by means of the gas flow, typically being the air and/or urea flow, through the valve and/or mixing device. Secondly, the vibration induced by the movement of the valve may loosen crystals located on surfaces of the valve or mixing device so that the crystals may be washed out by the fluid flow through the valve and/or the mixing device.

2. The channels of the mixing device and in particular the channel leading air into a mixing chamber for mixing air with urea may be made of or coated by a non-sticking material, such as Teflon. In case crystals are formed the non-sticking surfaces will prevent the crystal from sticking to the surfaces whereby the will be washed out of the mixing device.

3. The mixing device or at least parts thereof are heated to melt the urea crystals so that the fluid flowing through the device can wash them out.

4. The urea inlet and the air inlet to the mixing chamber may be arranged such that the urea will flush the area surrounding the air inlet such that possible urea crystals formed will be soaked, and thereby dissolved and be washed away.

In the following different embodiments embodying one or more of these measures are disclosed in details.

In FIG. 2 a first embodiment of a mixing device 1 according to the present invention is shown. The mixing device 1 comprises a housing 2. The housing 2 is shown as a single integrated unit, but may comprise several parts, as indicated in FIG. 6. The mixing device 1 further comprises two inlets: one inlet 10 for inletting urea and one inlet 12 for inletting pressurised air into the mixing device. The mixing device also comprises an outlet 14 through which the mix of air and urea exit the mixing device and enters into the exhaust system.

Inside the mixing device two valves are arranged; one valve 16 for controlling the flow of urea and one valve 18 for controlling the flow of air into a mixing chamber 20. The mixing device is designed so that the valve 18 will when being pressurised make a reciprocating movement whereby any crystals that may have been formed at least in the vicinity of the valve where the air enters into the mixing chamber 20 is destroyed. The valve 16 is deliberately arranged upstream of point where air is introduced. The reason for this is that in case some crystal has been formed the stream of wet urea will have a tendency to dissolve these formed crystal. The mixing device according to FIG. 2 therefore prevent depositing of crystals that could clog the valves and/or mixing chamber by two means namely by the vibration introduced by the reciprocating movement of the valve 18 and the downstream position of the point where air is introduced into the stream of urea.

In the following description of alternative embodiments of the invention like references are used for like parts, although the details may differ.

In FIGS. 3A-B a second embodiment of a mixing device 1 is disclosed. The mixing device comprises a housing 2 containing a mixing chamber 20. The housing 2 is shown a single integrated unit, but may comprise several parts, as indicated in FIG. 6.

A urea inlet 10 is arranged in the mixing device 1 in order to supply urea from a urea container (not shown) to the mixing chamber. Correspondingly, an air inlet 12 is arranged in the mixing device 1 in order to supply pressurized air from a pressure source (not shown) to the mixing chamber 20. A valve 16 is preferably arranged at the urea inlet 10 to the mixing chamber. The urea inlet 10 in this embodiment preferably arranged centrally with respect to the mixing chamber 20. The mixing chamber is preferably generally cylindrical and arranged with the longitudinal axis of the cylindrical mixing chamber 20 being essentially horizontally positioned.

An outlet 14 is arranged from the mixing chamber for connecting the mixing chamber 20 to the exhaust pipe in order to supply urea/air mixture from the mixing device 1 to the exhaust from the combustion engine. The air inlet 12 and the outlet 14 are preferably arranged such that they are diametrically positioned on the cylindrical mixing chamber 20 wall, and such that the air inlet is on un an upper part of the wall and the outlet 14 is on the lower side of the wall. The air inlet 12 being arranged in the top of the chamber 20 will reduce the accumulation of crystals in the area of the inlet 12.

The air inlet 12 is arranged such that the air entering the mixing chamber 20 is forced into a cyclonic movement inside the chamber 20 in order to improve purging. This is achieved by arranging the at least one air inlet channel a longitudinal axis of the inlet 12 is positioned essentially tangentially to the cylindrical wall of the mixing chamber 20 as can be appreciated from FIG. 3B. The cyclonic movement of air inside the mixing chamber will reduce the likelihood of crystal formation in the mixing chamber 20 because it will cause the moist urea to flush the entire mixing chamber, such that a potential crystal formation will be soaked (and thereby dissolved) and mechanically flushed away.

The air inlet 12 and optionally parts of or the entire inside wall of the mixing chamber 20 is preferably formed in or coated with a non-stick material, e.g. PTFE. Thus the risk of crystal formation is reduced.

The cavity forming the mixing chamber 20 in front of the urea inlet valve 16 is drained because the mix outlet 14 is located at the lower level of the mixing chamber 20, such that when the engine is turned of and the addition of the urea mix to the exhaust is no longer required the presence of crystal forming material is kept away from the air inlet 12.

In FIG. 4 a third embodiment is disclosed. Also, in this embodiment the mixing device 1 comprises two inlets 10 and 12 for inletting urea and air respectively, an outlet 14 for outlet 14 of mixed urea and air, and a mixing chamber 20 arranged in a housing 2. The housing 2 is, as in FIGS. 2 and 3, shown as a single integrated unit, but may comprise several parts, as indicated in FIG. 10.

The mixing device 1 also comprises two valves 16 and 18 for delivery of urea and air, respectively. While the valve 16 may be a conventional valve the valve 18 has been designed to prevent or limit growth of crystal. The valve 18 comprises a flat member 18a having a small penetration or orifice 19 in its centre. The flat member 18 abuts an abutment member 18b, when the pressure at the inlet 12 is below a given threshold. When the pressure at the inlet 12 exceed a given pressure the flat member 18 will bend outwards whereby the small penetration provided at the centre of it will be disclosed allowing a flow of air through it. In FIG. 4 the flat member 18a is shown in the situation where it abuts on the abutment member 18b, i.e. in a situation where the pressure of the air inlet 12 is below the above mentioned threshold.

The flat member 18a may be disc shaped and is preferably very thin, e.g. in the order of 0.1 mm, in order to reduce the risk of crystal formation in the orifice 19, because no solid surface for the crystal formation is provided due to the small thickness in the opening/orifice 19. The flexing of the flat member, in response to pressure alterations will loosen crystal formations on the flat member. The flat member is preferably stamped and punched from a stainless steel sheet plate. It can be coated with a non stick material e.g. Teflon or it can be non coated.

If a crystal formation should clog the orifice 19 the pressure difference over the flat member 18a will build until a flexing of the flat member 18a will occur, thus loosening the crystal formation, whereby the crystal can be flushed away.

The flat member 18a may be formed such that is opens at one pressure difference over the member and closes at another lower pressure difference, e.g. it opens at 1.3 bar, and closes at 0.8 bar. Thereby it is obtained that the flat member 18a will not open and close constantly, due to changes in the pressure difference over the flat member 18a, which will naturally occur due to fluctuations in the pressure delivered from the pressure source and due to fluctuations in the pressure on the exhaust pipe side of the flat member induced, e.g. by the engine status.

The urea inlet 10 is preferably arranged at the top of the mixing chamber 20 above the air inlet 12 in the mixing chamber 20, such that urea by gravity will flow over the air inlet 12, and thus soak and dissolve crystal formed on the flat member 18a.

The cavity forming the mixing chamber 20 is drained because the mix outlet 14 is located at the lower level of the mixing chamber 20, such that when the engine is turned of and the addition of the urea mix to the exhaust is no longer required the presence of crystal forming material is kept away from the air inlet 12.

The invention claimed is:

1. A mixing device for mixing urea with a gas, said urea being dissolved in a fluid, the device comprising
   a urea inlet and a gas inlet for feeding respectively urea and the gas into a mixing chamber of the mixing device, and an outlet for outlet of the mix of urea and gas from the mixing chamber, wherein at least the gas inlet for feeding gas into the mixing chamber is designed so that crystals deposited on selected surfaces of said inlet are removed from the surfaces during use of the mixing device, wherein
   the mixing device further comprises a valve in the gas inlet, and
   wherein removal of the crystals on selected surfaces of the gas inlet is provided by the valve comprised in the gas inlet, said valve being adapted to perform a reciprocating movement while the valve is pressurized so as to loosen urea crystals deposited in the mixing device, wherein the reciprocating movement is a vibration of the valve induced when the valve is pressurized and said vibration of the valve removes the deposited crystals.

2. The mixing device according to claim 1, wherein the valve comprises a flat member having a penetration, said flat member abuts a upstream member in the inlet in the vicinity of the penetration when the pressure difference over the flat member is below a first pre-selected threshold so as to provide a sealing of the gas inlet, and wherein said flat member does not abut the upstream member when the pressure difference over the flat member is above a second pre-selected threshold so as to allow air to flow into the mixing chamber through the penetration.

3. The mixing device according to claim 2, wherein the flat member is adapted to induce a reciprocating movement towards the upstream member when gas is flowing through the penetration so that the flat member successively seats and unseats against the upstream member.

4. The mixing device according to claim 1, wherein the gas inlet runs into the mixing chamber downstream of the position where the urea inlet runs into the mixing chamber.

5. The mixing device according to claim 1, wherein at least a part of the surface of the gas inlet is smooth or non sticking so as to avoid crystals from be deposited thereon.

6. The mixing device according to claim 5 wherein the smoothness is provided by polishing or coating.

7. The mixing device according to claim 6, wherein the coating is a Teflon coating (PTFE) or at least a part of the device is made of Teflon (PTFE).

8. The mixing device according to claim 5, wherein the part of the surface that is smooth is an orifice flowing into the mixing chamber.

9. The mixing device according to claim 8, wherein the orifice guides the gas stream into the mixing chamber in such a manner that a vortex is generated or amplified.

10. The mixing device according to claim 1, wherein at least a part of the surface of the mixing chamber is smooth or is non sticking so as to avoid crystals from being deposited thereon.

11. The mixing device according to claim 1, further comprising a heater configured to heat at least a part of the gas inlet or a part of the mixing chamber to a temperature to above 132° C.

12. The mixing device according to claim 11, wherein the heater is adapted to heat the area where the gas inlet runs into the mixing chamber.

13. The mixing device according to claim 11, wherein the heater comprises an electrical element that generates heat when an electrical current is applied.

14. The mixing device according to claim 1, further comprising a metering pump for metering liquefied urea and pumping the liquefied urea to the urea inlet.

15. The mixing device according to claim 1, further comprising an air source for supplying pressurized gas to the gas inlet.

16. An engine comprising a mixing device according to claim 14, wherein the outlet of the mixing device is connected to the exhaust system of the engine.

17. The engine according to claim 16, wherein the engine is a diesel engine.

18. The engine according to claim 16, further comprising a measuring and controlling unit configured to measure power of the engine, temperature of exhaust gasses, RPM or fuel consumption, and wherein the measuring and controlling unit determines the amount of urea to be added to the exhaust gasses and controls the metering pump accordingly.

19. A vehicle comprising an engine according to claim 16.

20. A vehicle according to 19, wherein the air source is an air compressor supplying pressurized air not only to the mixing device.

21. The mixing device according to claim 1, wherein said valve is adapted to perform a reciprocating movement so as to loosen urea crystals deposited in or in the vicinity of an outlet of the valve to the mixing chamber.

* * * * *